March 31, 1953 — J. W. KAYLOR — 2,633,305

MOTION-PICTURE MAGAZINE

Filed May 10, 1948 — 2 SHEETS—SHEET 1

James W. Kaylor, INVENTOR.

BY Robert O. Fulwider
ATTORNEY

March 31, 1953  J. W. KAYLOR  2,633,305
MOTION-PICTURE MAGAZINE
Filed May 10, 1948  2 SHEETS—SHEET 2

James W. Kaylor,
INVENTOR.

BY Robert W. Fulwider
ATTORNEY

Patented Mar. 31, 1953

2,633,305

UNITED STATES PATENT OFFICE 2,633,305

MOTION-PICTURE MAGAZINE

James W. Kaylor, Burbank, Calif., assignor to Cinecolor Corporation, Burbank, Calif., a corporation of California Application May 10, 1948, Serial No. 26,201

8 Claims. (Cl. 242—55)

My invention relates generally to magazines for motion picture cameras, and more particularly to devices of this type having novel means for controlling the supply and take-up of the film supplied to the camera.

While magazines for holding the supply and take-up reels have long been known and used in the motion picture industry, these prior devices have been subject to many criticisms, particularly from the standpoint of the cameraman and the technician charged with the responsibility of handling both the exposed and unexposed film. For example, as film is transferred from the supply to the take-up reels, the supply reel tends to coast after the camera is stopped, thereby loosening the film and producing a condition conducive to film breakage. Furthermore, as film is transferred to the take-up reel, the latter must turn more slowly as the diameter of the roll of film increases.

The tendency of the supply reel to coast has largely been overcome by the incorporation of a friction brake in the supply reel spindle, and the varying speed of rotation of the take-up reel has been provided by a clutch interposed between its drive pulley and spindle.

However, without any notable exception, the prior clutches have been either non-adjustable, or adjustable only from the interior of the magazine. Consequently, if it is necessary to adjust the clutch of one of the prior magazines during the photographing of a picture, it is necessary to remove the magazine from the camera and open it in a darkroom, remove the film therefrom and then adjust the clutch in the camera department workshop. This is obviously a very inefficient method of operation, but has been used because of the lack of a better method.

Where two or more separate films are mounted upon coaxial reels within a single magazine, the problems and difficulties have been greatly increased. For example, while it may be merely inconvenient and wasteful of time to change a magazine during the photographing of a picture where only a single film is used, the same task is much more involved and requires a longer time to perform where a plurality of films are being used. In addition, in the photography of motion pictures in natural color, where the greatest use is made of plural negatives, the emulsion characteristics of each individual film are very important, and the change from one magazine to another may require the re-balancing of the lighting of a scene, and the change of many light filters. Furthermore, the rotation of a plurality of take-up reels by a single drive pulley requires that the various clutches be properly balanced, and this adjustment becomes very difficult where a plurality of partially filled reels are located upon a single spindle.

It is therefore a major object of my invention to provide a film magazine having improved means for controlling the operation of the supply and take-up reels.

Another object of my invention is to provide such a magazine adapted to receive a plurality of coaxially mounted supply and take-up reels, the supply and take-up reel of one film operating substantially independently of the supply and take-up reel of the other film.

It is a further object of my invention to provide a clutch for such a magazine that may be adjusted from the exterior thereof so that all adjustments may be made while the magazine is upon the camera.

Another object of my invention is to provide such a clutch mechanism having independent adjustments for the different take-up reels so that the tension upon one film may be controlled independently of the other film.

It is a still further object of my invention to provide such a magazine whose construction is simple, and which may be used upon existing cameras without modification of the latter.

These and other objects and advantages of my invention will become apparent from the following description of a preferred form thereof, and from the drawings illustrating that form in which Fig. 1 is a side elevational view, partially broken away, of my improved magazine as it appears upon a camera;

Figure 1:
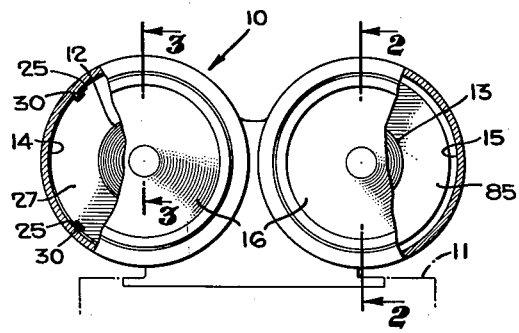
Figure 3:
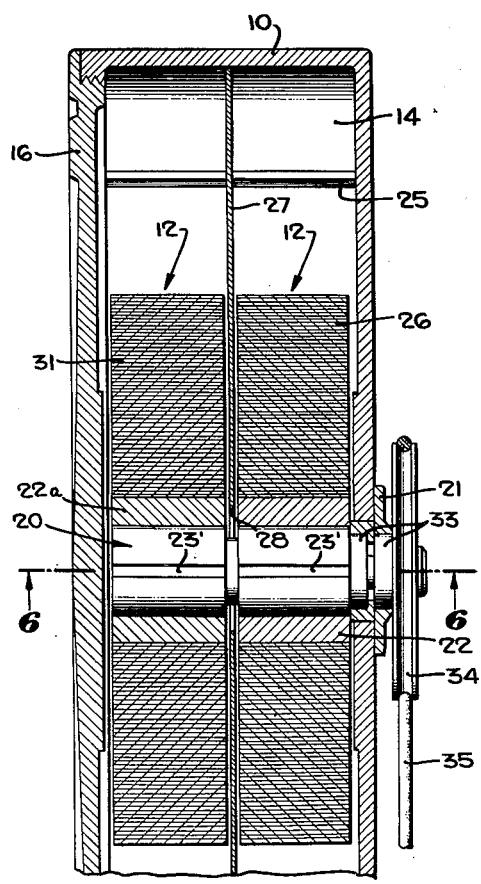
Fig. 3 is a similar view taken on the line 3—3 of Fig. 1 and showing the supply reel.
Figure 2:
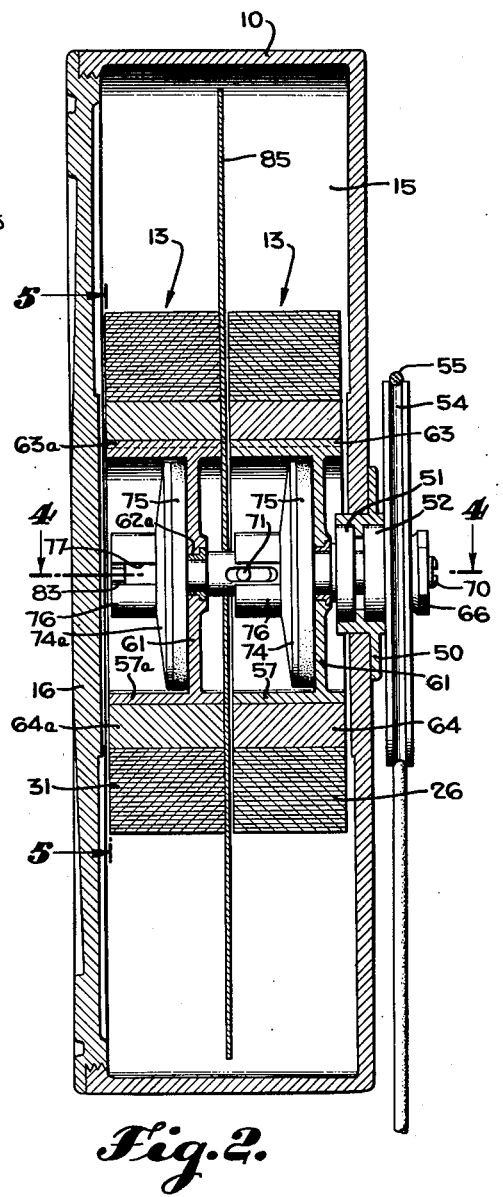
Fig. 2 is a cross-sectional view taken through the magazine on the line 2—2 in Fig. 1, showing the clutch and take-up reel.

Referring now to the drawings and particularly to Figs. 1 to 3 thereof, the numeral 10 indicates generally a magazine housing adapted to fit upon a camera 11 in the customary manner and to contain a supply reel 12 and a take-up reel 13. As previously indicated, while the design of my improved magazine is well adapted to the form of construction wherein a single film, having a single supply and a single take-up reel is used, it is particularly well adapted to the use where a plurality of films, with a corresponding plurality of reels, are to be used. Consequently, in the preferred embodiment herein illustrated, I have shown the magazine as it may be designed to receive a pair of films.

As seen in Figs. 1 to 3, the housing 10 has a pair of cylindrical compartments 14 and 15 therein adapted to receive the supply and take-up reels 12 and 13 respectively. Each of the compartments 14 and 15 is closed by a light-tight cover 16, the depth of the compartments being such as to receive a pair of films in side-by-side relationship. While it will become apparent that my improved magazine may be used with films of any desired size, it will find its principal use in the commercial production of motion pictures where the conventionally used film is 35 millimeters wide. Consequently, the compartments 14 and 15 will generally be slightly more than 70 millimeters in depth, thus accommodating two standard 35 millimeter films on coaxial reels, with clearance between the films and the housing 10 and the cover 16. A spindle 20 is concentrically mounted in the compartment 14 by a bushing 21 that is supported by the wall of the housing 10 opposite the cover 16.

It will be appreciated by those skilled in the art that unexposed motion picture film is customarily supplied in 1,000 foot lengths, wound upon a small core or hub 22 of plastic or other suitable material, adapted to fit upon the spindle 20. Each of the hubs 22 is customarily provided with an axially extending key 23, and the spindle of my improved magazine is provided with a cooperating keyway (not shown) adapted to receive the key and hold the hub against rotation with respect thereto. Since the hubs 22 are customarily provided without any outwardly extending flanges to hold the film thereon, I have found it desirable to provide a plate adapted to fit within the compartment 14 in such a manner as to separate the latter into two spaces so that the film from one roll cannot become loose and rest upon the other roll. I prefer to accomplish this by mounting a plurality of inwardly projecting, radially extending lugs 25 upon the inner surface of the compartment 14, the lugs being small enough to permit the insertion of the full size roll of film in the magazine. After one roll of film, designated by the numeral 26, is placed within the compartment 14 adjacent the wall of the latter remote from the cover 16, a generally circular disc 27, having a central aperture 28 adapted to fit over the spindle 20, is placed within the compartment against the roll of film. The disc 27 has notches 30 cut in its outer periphery adapted to engage the lugs 25 to hold the disc against rotation with respect to the magazine. The second roll of film, designated by the numeral 31, is then placed upon the spindle 20 and the cover 16 tightened upon the magazine. In this way, the rolls of film 26 and 31 are kept separate from each other at all times while remaining within the same compartment 14.

Figure 6:
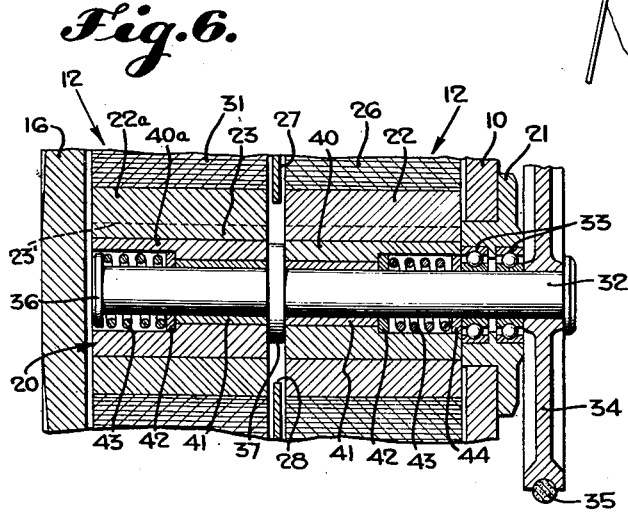
Fig. 6 is a cross-sectional view taken on the line 6—6 of Fig. 3 to show the construction of my improved brake mechanism.

As previously mentioned, it is desirable to provide some method of retarding the rotation of the spindle 20 to prevent coasting of the rolls 26 and 31, with a consequent loosening of the film. I have accomplished this in my improved magazine by providing a friction brake within the spindle 20, shown in more detail in Fig. 6. As indicated in that figure, the spindle 20 includes a shaft 32 supported at one end by anti-friction bearings 33 mounted in the bushing 21. On its outer end, the shaft 32 is provided with a pulley 34 that is keyed to the shaft for rotation therewith and adapted to receive a belt or similar member 35 which may be held against rotation in a manner somewhat analogous to that of the Prony brake. The shaft 32 is thus capable of rotation, but is retarded or braked by the action of the pulley 34 and belt 35. The latter, in a manner well known in the art, is adjustably held by any convenient anchoring means mounted upon the camera 11.

At its inner or opposite end, the shaft 32 is provided with a radially extending flange 36, and a similar but larger flange 37 is provided substantially midway between the flange 36 and the inner surface of the bushing 21. For convenience in assembling, the flange 36 is preferably formed by a flat-headed screw threaded into the shaft 32.

Mounted upon the shaft 32 are a pair of cylindrical cores 40 and 40a adapted to fit within the hubs 22 and 22a of the rolls 26 and 31, respectively, each core being substantially the same length as its associated hub, and having a central aperture therein adapted to receive an anti-friction bearing 41 such as a bronze bushing. The cores 40 and 40a are thus free to rotate upon the shaft 32, but it will be noted that the diameter of the central flange 37 is sufficiently large to bear against the adjacent ends of the cores so that if the latter are pressed toward the flange, there will be a frictional restraint upon their rotation with respect to the shaft.

To provide this restraint, I counterbore or otherwise enlarge the diameter of the central apertures of the cores 40 and 40a at opposite ends thereof and insert washers 42 adapted to fit snugly within the enlarged portion of the bore and bear against one end of the bushing 41 and the shoulder formed in the core. It will be noted that the position of the cores 40 and 40a with respect to each other is reversed so that the ends of the latter having the bushings 41 thereon bear against the central flange 37, while the ends having the enlarged central apertures are remote from the flange. Within the enlarged central aperture of the core 40 adapted to receive the roll 31, I place a helical compression spring 43 whose opposite ends bear against the washer 42 and the flange or screw 36, respectively. In this manner, the spring 43 urges the core member 40 against the adjacent surface of the flange 37, thereby providing a frictional drag upon the core while still permitting the latter to rotate with respect to the shaft 32. In a similar manner, a helical compression spring 43 is inserted within the enlarged end of the core 40a holding the roll 26, with one end of the spring bearing against the washer 42 inserted within the central opening. The other end of the spring, however, instead of bearing against a flange such as the flange 36, bears against a washer 44, generally similar to the washers 42, which in turn bears against the bearing 33. Since the inner portion of the bearing 33 is anchored to the shaft 32, the washer 44 and the inner portions of the bearing thus cooperate to act in a manner similar to the flange 36. In this manner, the core 40a is urged against the central flange 37 to provide a frictional drag on this core while still permitting its rotation with respect to the shaft 32.

From the foregoing, it will be seen that I have provided a magazine wherein each of the supply reel cores is rotatably held by a spindle 20, and the spindle itself is capable of rotation with respect to the housing 10. However, the shaft 32 of the spindle 20 is provided with a friction brake arrangement including the pulley 34 and belt 35 which restrains the rotation of the shaft, while the two cores 40 and 40a are separately provided with braking or restraining means which retard or hinder their rotation with respect to the shaft. As a result, by suitably adjusting the various braking elements it is possible to secure the major portion of the braking effort from the pulley 34 and belt 35, while the individual brake assemblies for the separate cores 40 and 40a provide for any differences in rotational speed between the rolls 26 and 31. It will be understood, of course, that these differences in rotational speeds will occur whenever the diameter of one of the rolls of film, either 26 or 31, is greater than the diameter of the other roll of film.

Figure 4:
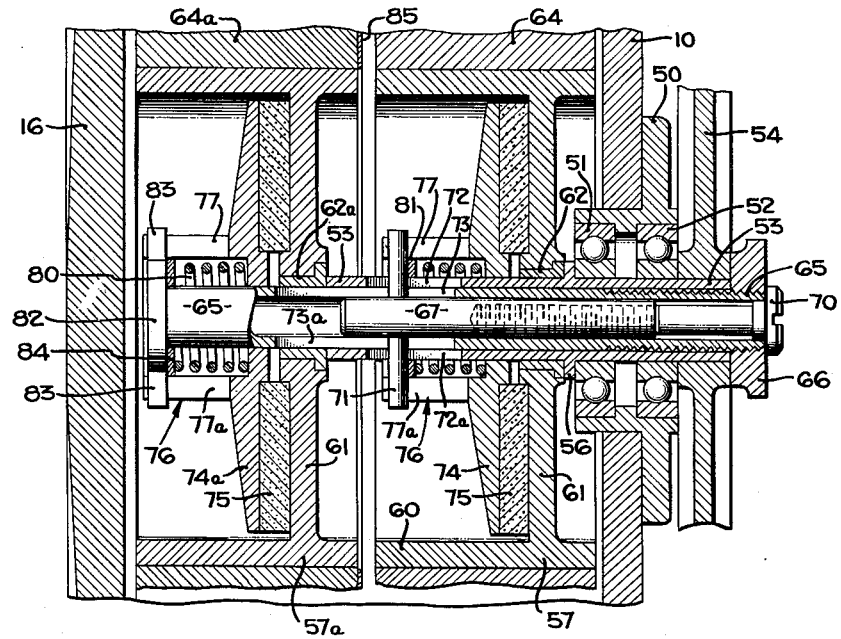
Fig. 4 is a cross-sectional view taken at 4—4 in Fig. 2 to show the details of construction of my improved clutch mechanism.
Figure 5:
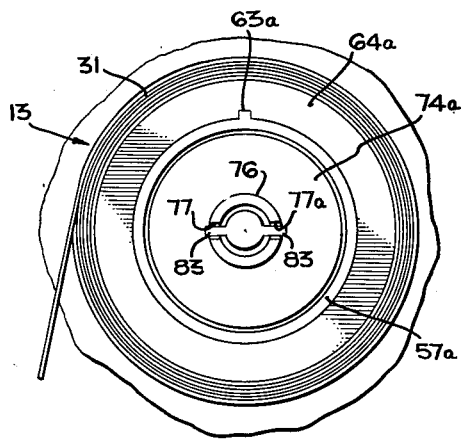
Fig. 5 is an elevational view taken on the line 5—5 of Fig. 2.

To cooperate with my improved film supply roll braking assembly, I have developed an improved take-up clutch assembly shown in Figs. 2, 4 and 5. From these views it will be seen that the compartment 15 is generally similar to the compartment 14 previously described, with the exception that the lugs 25 are omitted. The compartment is closed by a cover 16 similar to the previously described cover, and a light-tight compartment for the receiving of exposed photographic films is thus provided.

Centrally located in the vertical wall of the housing opposite the cover 10 is a bushing 50 constructed and adapted to support the take-up and clutch assembly now to be described. As indicated in Figs. 2 and 4, the bushing 50 includes anti-friction bearings of any suitable type such as ball bearings 51 and 52, while a hollow shaft 53 is supported by the bearings for rotation with respect to the housing 10. Firmly affixed to the outer end of the hollow shaft 53 is a take-up pulley 54 adapted to receive a belt 55 or similar driving means, in a manner well known in the art.

Adjacent the inner edge of the bearing 51, I form an externally extending flange 56, and inwardly from the flange I mount a drum 57. As indicated, the drum 57 includes a hollow cylindrical member 60 having an inwardly directed flange 61 extending substantially to the hollow shaft 53. At its center, the flange 61 is provided with an aperture adapted to receive an anti-friction bearing 62 such as a bronze bushing. The drum 57 is thus free to rotate with respect to the hollow shaft 53, and one end of the bushing bears against the adjacent flange 56 on the shaft. The outer surface of the cylindrical portion 60 of the drum 57 is provided with a key 63 adapted to engage a core or spool 64 that is slipped over the drum, the film being wound upon the spool as the drum is rotated.

Within the hollow shaft 53 is a tubular shaft 65 making a snug but slidable fit therewith and having external threads at its outer end to receive a nut 66. A core 67 is slidably mounted within the tubular shaft 65, and has a threaded bore in its outer end adapted to receive a correspondingly threaded screw 70 whose head bears against the outer end of the tubular shaft. A pin 71 is passed through the core 67 near the inner end of the latter, extending in a direction perpendicular to the axis of the core and passing through associated slots 72 and 73 in the hollow shaft 53 and tubular shaft 65 respectively. Since the pin 71 extends diametrically through the core 67 and out each side of the latter, the slots 72 and 73 find their counterpart in diametrically opposite slots 72a and 73a respectively, all of the slots extending in a generally axial direction. The slots are substantially equal to the width of the pin 71, and thus the core 67, the tubular shaft 65, and the hollow shaft 53 are rotated in synchronism by the pulley 54. However, the relative axial position of the core 67 with respect to the tubular shaft 65 may be varied by rotation of the screw 70, while the relative axial position of the tubular shaft with respect to the hollow shaft 53 may be varied by rotation of the nut 66.

Mounted on the hollow shaft 53 in a direction inwardly (to the left in the drawings) from the drum 57 is a clutch plate 74 comprising a radially extending flange carrying an annular ring 75 of resilient material such as hardened felt. The ring 75 is adapted to bear against the inner surface of the flange 61 of the drum 57, and the clutch plate 74 is axially movable upon the hollow shaft 53 so that the pressure between the ring and the adjacent surface of the flange 61 may be varied to change the rotational power transmitted from the clutch plate to the drum.

Extending axially from the inner portion of the clutch plate 74 is a cylindrical member 76 spaced from the hollow shaft 53 and provided with a pair of diametrically opposite axially extending slots 77 adapted to receive the pin 71. Within the annular space between the cylindrical member 76 and the hollow shaft 53 I insert a helical compression spring 80 adapted to have one of its ends bear against the clutch plate 74, while the other end bears against a washer 81 surrounding the hollow shaft and bearing against the pin 71.

The engagement of the pin 71 with the sides of the slots 77 and 77a provides a positive drive for the clutch plate 74, while the pressure with which the plate urges the ring 75 against the flange 61 may be controlled by varying the position of the core 67 by adjustment of the screw 70. As the core 67 is moved outwardly, to the right in Fig. 4, the pin 71 is moved with the core, while the flange 61 is held stationary by the flange or collar 56. The pin 71 thus approaches the flange 61, compressing the spring 80 and urging the clutch plate 74 toward the flange 61 with a greater pressure. When the spring 80 is released, little power is transmitted between the clutch plate 74 and the drum 57, so that very little torque need by applied to the latter to cause it to slip with respect to the clutch plate and thus with respect to the pulley 54. However, as the spring 80 is compressed, more power is transmitted and a greater torque must be applied to the drum 57 to overcome the drive of the pulley 54.

It will be appreciated that the drum 57, adjacent the bushing 50, is adapted to receive the film from the roll 26 in the supply reel compartment 14, and a take-up core 64 is slidably mounted on the drum, as previously mentioned. A similar core 64a is provided for the film from roll 31, this core being supported and driven in a manner similar to that just described. As shown in Fig. 4, a drum 57a similar to the drum 57 is mounted on the tubular shaft 65 at the inner end of the hollow shaft 53, and an anti-friction bearing such as a bushing 62a supports the drum upon the shaft and bears against the end of the hollow shaft 53 in a manner similar to the bushing 62 which supports the drum 57 and bears against the flange 56. A clutch plate 74a, similar in all respects to the clutch plate 74 except for the diameter of the central aperture therein, is placed upon the end of the tubular shaft 65 with a ring 75 between the surface of the clutch plate and the web 61 of the drum 57a.

At its ends, the tubular shaft 65 is provided with an outwardly extending flange 82 having lugs or ears 83 projecting radially outwardly therefrom, the latter being adapted to engage the slots 77 and 77a of the cylindrical member 76 in a manner similar to their engagement by the pin 71 in the case of the clutch plate 74. A washer 84 is placed on the tubular shaft 65 adjacent the flange 82, and a spring 80 bears against the washer and the face of the clutch plate 74a to urge the latter toward the flange 61 of the drum 57a. In this manner, a clutch assembly very similar to that previously described for the drum 57 is formed in which the power transmitted by the clutch can be adjusted by moving the tubular shaft 65 axially with respect to the hollow shaft 53. By rotation of the nut 66, the tubular shaft 65 may be moved axially with respect to the hollow shaft 53, thereby permitting the adjustment of the clutch assembly for the drum 57a from the outside of the magazine.

As previously pointed out, the clutch driving the drum 57 can be adjusted from the exterior of the magazine by rotation of the screw 70, and thus both of the clutches may be adjusted without requiring access to the interior of the magazine. However, since the clutch assembly for the drum 57 is controlled by the position of the core 67 with respect to that drum or to the hollow shaft 53, any axial movement of the core either with the tubular shaft 65 or with respect thereto, will affect the operation of the clutch. Thus, movement of the tubular shaft 65 by adjustment of the nut 66 will also move the core 67 relative to the drum 57, while rotation of the screw 70 will move only the core. Therefore, when the tubular shaft 65 is axially moved with respect to the hollow shaft 53 by rotation of the nut 66, the adjustment of the clutch associated with the drum 57a is affected, while at the same time, the core 67 is likewise moved, consequently changing the adjustment of the clutch associated with the drum 57. As a result, both clutch assemblies are simultaneously changed by an adjustment of the nut 66. If only the torque transmitted to drum 57a is to be changed, this may be accomplished by rotating the nut 66 the desired amount, and then rotating the screw 70 an equal amount in the opposite direction. This assumes, of course, that the pitch of the threads on the tubular shaft 65 and nut 66 is equal to the pitch in the core 67 and screw 70. However, for obvious reasons, these will normally be the same so that the adjustment remains simple and uncomplicated. If only the torque transmitted to the drum 57 is to be changed, this may be done by adjusting the screw 70, which has no effect upon the adjustment of the clutch associated with the drum 57a.

To receive the film from the roll 31, I provide a take-up core 64a similar to the take-up core 64 used on the drum 57, but provided with a radially extending flange or disc 85 to act in a manner similar to the disc 27 of the supply compartment 14. The flange 85 is bolted or otherwise securely held to one side of the core 64a, this being the side of the core which is adjacent the core 64. In this way, the films from the rolls 26 and 31 are smoothly and uniformly removed from those rolls, passed through the camera, and then wound upon the cores 64 and 64a respectively. It will be appreciated, of course, that the housing 10 is provided with film apertures along its lower surface to permit the removal of the film from the compartment 14, and its return to the compartment 15. This type of construction is well known in the art, and in and of itself forms no part of my invention.

Should it be desired to provide a magazine having provision for only a single film, it will be appreciated that this may readily be done in accordance with the teachings herein. The construction of such a form would result in a very considerable simplification, particularly in the case of the take-up clutches, while retaining all of the benefits secured from the use of my improved magazine. One of the most important features of my magazine is the provision of means to adjust the clutch tension from the exterior of the magazine, and this advantage will be retained whether the single or multiple film magazine construction is used.

It will be apparent that these and other modifications of my device may be made by those skilled in the art without departing from the broad teachings of my invention as disclosed herein. However, I do not wish to be restricted to the particular form or arrangement of parts herein described and shown, except as limited by my claims.

I claim:

1. A film magazine which includes: a housing having supply and take-up reel compartments therein, each of said compartments being of a size sufficient to receive a pair of coaxial reels; a spindle within said supply compartment comprising a shaft mounted on a wall of said compartment, a pair of coaxial cores mounted on said shaft, each adapted to receive a roll of film, and a pair of slippable clutches, each of said clutches being associated with one of said cores and cooperating therewith, whereby said cores are rotatable with respect to said shaft and to each other; and a spindle within said take-up compartment comprising a rotatable shaft extending through a wall of said housing, a pair of coaxial drums within said take-up compartment, mounted on said shaft for rotation with respect thereto and to each other, a pair of slippable clutches mounted on said shaft and driven thereby, each of said clutches being associated with one of said drums and cooperating therewith, driving means on said shaft external of said housing for rotating said shaft and said clutches, and means on said shaft external of said housing and adjacent said driving means for adjusting the slippage characteristics of each of said clutches, at least one of said clutches being so adjustable independently of the other, and both of said clutches being separated by the wall of said housing from their respective adjusting means.

2. A film magazine which includes: a housing having supply and take-up reel compartments therein, each of said compartments being of a size sufficient to receive a pair of coaxial reels; a spindle within said supply compartment comprising a shaft mounted on a wall of said compartment, a pair of coaxial cores mounted on said shaft, each adapted to receive a roll of film, and a pair of slippable clutches, each of said clutches being associated with one of said cores and cooperating therewith, whereby said cores are rotatable with respect to said shaft and to each other; a shaft assembly within said take-up compartment extending through a wall of said housing; a pair of coaxial film receiving drums within said housing, mounted on said shaft assembly for rotation with respect thereto; a pair of coaxial clutch plates mounted on said shaft assembly and rotatably driven thereby in synchronism therewith, each of said plates being associated with one of said drums and bearing against a cooperating portion of the latter thereby providing a pair of independent slippable clutch assemblies; means on said shaft assembly external of said housing for rotating said shaft assembly; and other means on said shaft assembly external of said housing and adjacent said means for rotating said shaft for adjusting the pressure exerted by each of said clutch plates against the said cooperating portion of said associated drum, said adjusting means operating through the interior of said shaft assembly, at least one of said clutches being so adjustable independently of the other, and both of said clutches being separated by the wall of said housing from their respective adjusting means.

3. A clutch assembly of the type described which includes: a shaft assembly having at least a portion thereof held against axial movement and having driving means connected thereto; a first drum mounted on said shaft assembly for rotation with respect thereto and held against axial movement with respect to said axially immovable portion of said shaft assembly; a first clutch plate mounted on said shaft assembly for rotation therewith and axially movable with respect to said portion of said shaft assembly, said first clutch plate bearing against a portion of said first drum to form a first clutch therewith; a first means remote from said first clutch, and adjacent said driving means, operable through the interior of said shaft assembly to shift said first clutch plate axially with respect to said portion of said shaft assembly, whereby the slippage of said first clutch may be adjusted; a second drum mounted on said shaft assembly for rotation with respect thereto and held against axial movement with respect to said portion of said shaft assembly; a second clutch plate mounted on said shaft assembly for rotation therewith and axially movable with respect to said portion of said shaft assembly, said second clutch plate bearing against a portion of said second drum to form a second clutch therewith; and a second means remote from said first and second clutches and adjacent said first means and said driving means, operable through the interior of said shaft assembly to shift said second clutch plate axially with respect to said portion of said shaft assembly, whereby the slippage of said second clutch may be adjusted, at least one of said means, and the clutch associated therewith, being adjustable independently of the other, both of said clutches being on one side of said driving means, and both of said clutch shifting means being on the other side of said driving means.

4. A clutch assembly of the type described which includes: a hollow shaft; a member rotatably supporting said shaft at a point intermediate its ends; driving means mounted on said hollow shaft at one end thereof to rotate the latter; a tubular shaft within said hollow shaft, rotatable therewith and axially movable with respect thereto; a core within said tubular shaft, rotatable therewith and axially movable with respect thereto; a nut bearing against the driving-means end of said hollow shaft and engaging a threaded portion of said tubular shaft, whereby the latter may be moved axially with respect to said hollow shaft; a screw having a head bearing against the threaded end of said tubular shaft, and a threaded shank engaging a corresponding threaded hole in said core, whereby the latter may be moved axially with respect to said tubular shank; a first drum rotatably mounted on said hollow shaft on the side thereof remote from said driving means and held against axial movement with respect to said shaft; a first clutch plate mounted on said hollow shaft and comprising an outwardly projecting flange and an axially extending annular ring, said flange being adjacent to and bearing against a cooperating portion of said drum and said ring having axially extending slots therein; a diametrically extending pin mounted in said core, passing through cooperating axially extending slots in said tubular shaft and said hollow shaft, and engaging said slots in said annular ring to rotate said clutch plate; a compression spring within said ring, extending between said pin and said clutch plate to urge the latter against said drum, whereby the pressure therebetween may be controlled by moving said core axially with respect to said hollow shaft; a second drum rotatably mounted on said tubular shaft at the end of said hollow shaft and bearing against the latter in a manner to prevent axial movement with respect thereto; a second clutch plate mounted on said tubular shaft at the end thereof remote from said driving means, comprising an outwardly projecting flange and an axially extending annular ring, said flange being adjacent to and bearing against a cooperating portion of said second drum and said ring having axially extending slots therein; an outwardly projecting abutment at the end of said tubular shaft adapted to enter said slots in said ring of said clutch plate; and a second compression spring within said ring, extending between said abutment and said second clutch plate to urge the latter against said second drum, whereby the pressure therebetween may be controlled by moving said tubular shaft axially with respect to said hollow shaft.

5. A film magazine which includes: a housing having supply and take-up reel compartments therein, each of said compartments being of a size sufficient to receive a pair of coaxial reels; a spindle within said supply compartment comprising a shaft mounted on a wall of said compartment, a pair of coaxial cores mounted on said shaft, each adapted to receive a roll of film, and a pair of slippable clutches, each of said clutches being associated with one of said cores and cooperating therewith whereby said cores are rotatable with respect to said shaft and to each other; a hollow shaft within said take-up compartment extending through a wall of said housing; driving means mounted on said hollow shaft at one end thereof to rotate the latter; a tubular shaft within said hollow shaft, rotatable therewith and axially movable with respect thereto; a core within said tubular shaft, rotatable therewith, and axially movable with respect thereto; a nut bearing against the driving-means end of said hollow shaft and engaging a threaded portion of said tubular shaft, whereby the latter may be moved axially with respect to said hollow shaft; a screw having a head bearing against the threaded end of said tubular shaft, and a threaded shank engaging a correspondingly threaded hole in said core, whereby the latter may be moved axially with respect to said tubular shank; a first drum rotatably mounted on said hollow shaft on the side thereof remote from said driving means and held against axial movement with respect to said shaft; a first clutch plate mounted on said hollow shaft and comprising an outwardly projecting flange and an axially extending annular ring, said flange being adjacent to and bearing against a cooperating portion of said drum and said ring having axially extending slots therein; a diametrically extending pin mounted in said core, passing through cooperating axially extending slots in said tubular shaft and said hollow shaft, and engaging said slots in said annular ring to rotate said clutch plate; a compression spring within said ring, extending between said pin and said clutch plate to urge the latter against said drum, whereby the pressure therebetween may be controlled by moving said core axially with respect to said hollow shaft; a second drum rotatably mounted on said tubular shaft at the end of said hollow shaft and bearing against the latter in a manner to prevent axial movement with respect thereto; a second clutch plate mounted on said tubular shaft at the end thereof remote from said driving means, comprising an outwardly projecting flange and an axially extending annular ring, said flange being adjacent to and bearing against a cooperating portion of said second drum and said ring having axially extending slots therein; an outwardly projecting abutment at the end of said tubular shaft adapted to enter said slots in said ring of said clutch plate; and a second compression spring within said ring, extending between said abutment and said second clutch plate to urge the latter against said second drum, whereby the pressure therebetween may be controlled by moving said tubular shaft axially with respect to said hollow shaft.

6. A clutch assembly which includes: a hollow shaft; bearing means intermediate the ends of said shaft and supporting it for rotation but holding it against axial movement; driving means for rotating said shaft, mounted thereon adjacent one side of said bearing; a first drum mounted on said shaft adjacent the other side of said bearing, said drum being independently rotatable with respect to said shaft but held against axial movement with respect thereto; a first clutch plate mounted on said shaft for rotation therewith but axially movable with respect thereto, said clutch plate being adjacent said first drum and bearing against a portion thereof to form therewith a first slippable clutch; a second drum mounted on said shaft adjacent said first clutch plate, said second drum being independently rotatable with respect to said shaft but held against axial movement with respect thereto; a first control member extending generally axially through said shaft; a second clutch plate connected to said first control member for rotation therewith and with said shaft but axially movable with respect to said shaft, said clutch plate being adjacent said second drum and bearing against a portion thereof to form therewith a second slippable clutch, said first control member extending from said second clutch plate to a point adjacent said driving means; a second control member extending generally axially through said shaft, connected to said first clutch plate and extending therefrom to a point adjacent said driving means; a first adjusting means located on the side of said driving means remote from said bearing means, mounted on said first control member and operable to move said control member axially of said shaft and thereby control the pressure exerted by said second clutch plate against said second drum; and a second adjusting means located adjacent said first adjusting means and on the same side of said driving means, mounted on said second control member and operable to move the latter axially of said shaft and thereby control the pressure exerted by said second clutch plate against said second drum.

7. A clutch as described in claim 6 in which said first control member is a tube within said shaft, and said second control member is a rod within said tube, and in which said first adjusting means includes a nut rotatable with respect to, and bearing against said hollow shaft and engaging a threaded portion of said tube, while said second adjusting means is a screw whose head bears against said first adjusting means and whose threaded shank portion engages a cooperatively threaded portion of said rod.

8. A clutch assembly of the class described which includes: a shaft assembly having a driving end and a clutch end; bearing means supporting said shaft assembly for rotation, located intermediate said ends of said assembly; driving means mounted on the driving end of said shaft assembly adjacent said bearing means and adapted to rotate said assembly; a first drum mounted on said shaft assembly near the clutch end thereof, said drum being rotatable with respect to said shaft and held against axial movement with respect thereto; a first clutch plate mounted on said shaft assembly for rotation therewith adjacent said first drum, said plate bearing against a cooperating portion of said drum for the transmission of rotary power therebetween; a first adjusting means mounted on said shaft assembly between said driving means and the driving end of said assembly, said adjusting means being connected through the interior of said shaft assembly to said first clutch means to urge the latter toward said cooperating portion of said first drum; a second drum mounted on said shaft assembly near the clutch end thereof and adjacent said first drum, said second drum being rotatable with respect to said shaft and held against axial movement with respect thereto; a second clutch plate mounted on said shaft assembly for rotation therewith adjacent said second drum, said plate bearing against a cooperating portion of said second drum for the transmission of rotary power therebetween, said first and second drums being capable of rotation with respect to each other and to said shaft; and a second adjusting means mounted on said shaft assembly between said driving means and the driving end of said assembly, said second adjusting means being connected through the interior of said shaft assembly to said second clutch means to urge the latter toward said cooperating portion of said first drum.

JAMES W. KAYLOR.

REFERENCES CITED

The following references are of record in the file of this patent:

UNITED STATES PATENTS

| Number | Name | Date |
| --- | --- | --- |
| 938,772 | Lambert | Nov. 2, 1909 |
| 1,957,974 | Moreno | May 8, 1934 |
| 2,001,780 | Fry | May 21, 1935 |
| 2,231,145 | Watanabe | Feb. 11, 1941 |

FOREIGN PATENTS

| Number | Country | Date |
| --- | --- | --- |
| 225,247 | Germany | June 2, 1909 |